United States Patent [19]

Reumann

[11] 4,409,581

[45] Oct. 11, 1983

[54] PROCESS AND APPARATUS FOR MAGNETIZING, ON BOTH SIDES, THE SURFACES OF BODIES TO BE MAGNETIZED

[75] Inventor: Franz Reumann, Baden, Austria

[73] Assignee: Internationale Patente Verwertungsgesellschaft m.b.H., Vienna, Austria

[21] Appl. No.: 166,089

[22] Filed: Jul. 3, 1980

Related U.S. Application Data

[63] Continuation of Ser. No. 927,524, Jul. 24, 1978, abandoned.

[30] Foreign Application Priority Data

Jul. 28, 1977 [AT] Austria ................................. 5576/77

[51] Int. Cl.³ ............................................. H01F 13/00
[52] U.S. Cl. .................................... 335/284; 361/143
[58] Field of Search ........................ 335/284; 360/109; 361/143

[56] References Cited

U.S. PATENT DOCUMENTS 2,392,168 1/1946 Mages ................................. 335/284
3,139,567 6/1964 Atkinson ............................ 335/284
3,585,549 6/1971 Muller ................................ 335/284

Primary Examiner—Fred L. Braun
Attorney, Agent, or Firm—Michael J. Striker

[57] ABSTRACT

The process for magnetizing two opposite surfaces of a magnetizable body according to predetermined vectors includes the engagement of two magnetizing heads with each surface and rotation of the two heads relative to each other through a compensating angle corresponding to the angular deviation of actual magnetization from the desired position of magnetization vectors. Apparatus for performing such magnetization involves two juxtaposed magnetizing heads which are rotatable relative to one another.

2 Claims, 6 Drawing Figures

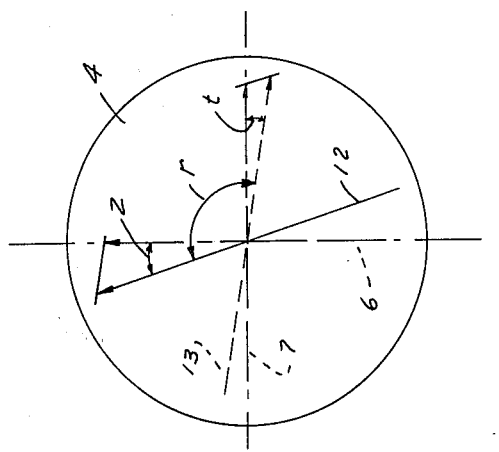
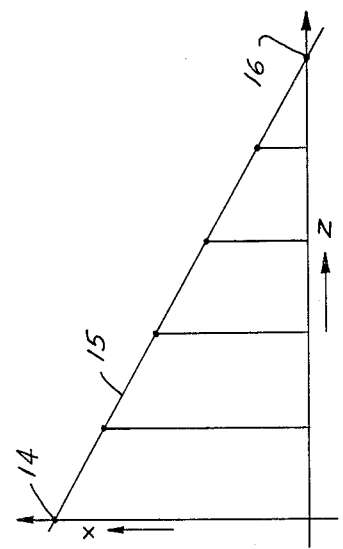
FIG. 5
FIG. 4
FIG. 6

PROCESS AND APPARATUS FOR MAGNETIZING, ON BOTH SIDES, THE SURFACES OF BODIES TO BE MAGNETIZED

This is a continuation of application Ser. No. 927,524, filed July 24, 1978, now abandoned.

The invention relates to a process and equipment for magnetising, on both sides, the surfaces of bodies to be magnetised, in particular those of magnet "pills" of key magnets for a magnetic lock and/or rotary magnets.

The process according to the invention is characterised in that the magnetising heads provided on both sides of the body to be magnetised have their magnetisation vectors rotated relative to one another by a compensating angle and the magnetisation is only effected thereafter.

According to an embodiment of the process according to the invention, the compensating angle can be determined empirically, or the compensating angle can be calculated in accordance with the equation $$z = \arcsin\left(\frac{\sin x \cdot \sin w}{\sin(w - x)}\right)$$

The apparatus according to the invention is characterised in that the magnetising heads are able to be rotated relative to one another to shift their magnetisation vectors by a compensating angle before the magnetisation of the body to be magnetised the possible compensating angle of the magnetising heads being intended to have at least such a magnitude that it lies within the ranges to be determined empirically or in range which results from the equation $$z = \arcsin\left(\frac{\sin x \cdot \sin w}{\sin(w - x)}\right)$$

In the diagrammatic drawing, the subject of the invention is represented in one embodiment.

FIGS. 2 and 4 illustrate magnetisation vectors on a pill.

Figure 3:
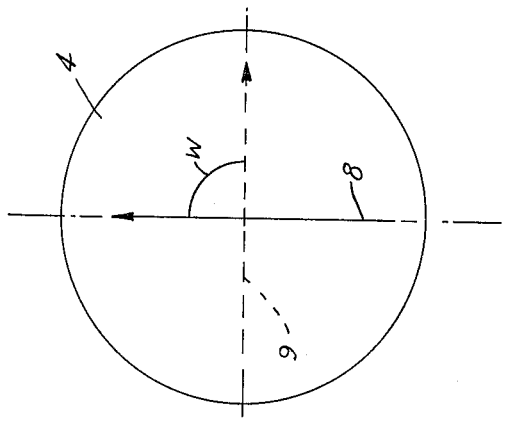

FIGS. 3 and 5 respectively reproduce the corresponding magnetisation vectors.

FIG. 6, shows a diagram for empirically determining the compensating angle.

Figure 1:
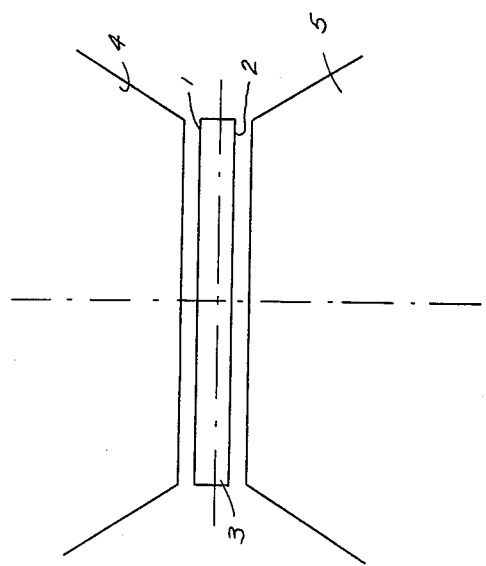
FIG. 1 shows apparatus for surface magnetisation on both sides.

In FIG. 1, the body 3 which is to be magnetised, for example a magnet pill, is located between two magnetising heads 4, 5. The two mutually opposite sides of the body 3 are designated as 1 and 2. The pill 3 is to be given a magnetisation on the two sides 1 and 2 in such a way that the magnetisation vectors on the two sides 1 and 2 are in the position shown in FIG. 2. In a manner which is in itself known, the coding for a magnetic lock is fixed by such a definite magnetisation. On the top 1 of the pill 3, the magnetisation vector 6 is drawn in a full line, and on the underside 2, the magnetisation vector 7 is drawn in as a broken line. As can be seen, these two intended vectors 6 and 7 together enclose a desired angle w. The coding on the underside 2 is thus envisaged to be rotated by this angle w which, for example, here is 90°, relative to the coding on the top 1, as a result of which a definite total coding for the magnetic lock is fixed.

Figure 2:
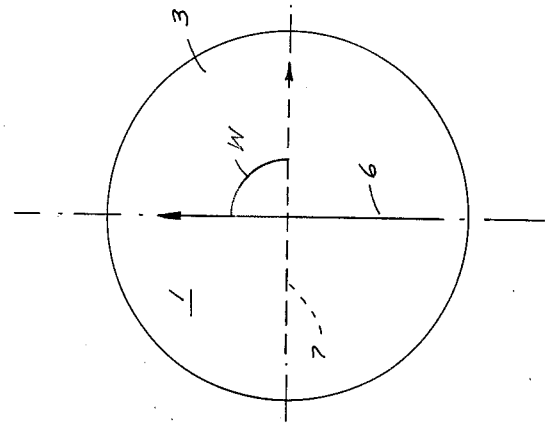

To obtain now this definitive coding according to FIG. 2, it would a prior be possible to use magnetising heads 4 and 5 which, as can be seen diagrammatically from FIG. 3, are magnetised in the same direction as the intended vectors 6 and 7. The upper magnetising head 4 then has a magnetisation vector 8 and the lower magnetising head 5 has a magnetisation vector 9. These two vectors 8 and 9 would then together enclose the same angel w. Under particularly simple conditions and with a low magnetisation, a case can occur where it is possible to obtain an at least substantially congruent magnetisation of the pill according to FIG. 2, using two such magnetizing heads according to FIG. 3.

With the present stringent demands on devices of this type and with the presently required high magnetisation of preferably more than two Tesla, however, a distorted magnetisation of the pill 3, as shown in FIG. 4, will result when the magnetisation heads 4 and 5 according to FIG. 3 are used. In fact, when magnetising one side 1 of the pill 3, there will be a "breakthrough" to the magnetisation of the other side 2 of this pill. It may be stated straight away that the said "breakthrough" is the larger, the higher is the magnetisation level of the pill. This breakthrough also depends on the permeability of the material, on the thickness of the pill and on other factors.

As a result of this breakthrough, the actual distorted magnetisation of the pill 3 (FIG. 4) is indicated by the vectors 10 (top) and 11 (underside). As shown in FIG. 4, the magnetisation vectors 10 and 11 of the pill are angularly displaced relative to the vectors 8 and 9 of the heads 4 and 5, by error angles x, y. The coding according to the vectors 10 and 11, thus obtained, does not correspond to the desired coding according to the vectors 8, 9. It can also be seen from FIG. 4 that the two vectors 10 and 11 together enclose an angle y which likewise does not correspond to the desired angle w.

In order to be able to eliminate the error angles x, v, the invention proposes providing the two magnetising heads 4 and 5 with magnetisation vectors which are shifted relative to one another by a corresponding compensating angle v, as shown in FIG. 5.

The upper magnetising head 4 generates a magnetisation vector 12, and the lower head 5 generates a magnetisation vector 13. The desired magnetisation shown in FIG. 2, then results on the pill 3. This resulting magnetisation is indicated in FIG. 5 by vectors 6 and 7. The angle z between the vectors 6 and 12 is an "upper" compensating angle in this sense. Due to the abovementioned magnetic breakthrough, it is necessary that the upper magnetising head generate a magnetisation vector 12 which is rotated relative to the desired vector 6 by the compensating angle z. Because of the breakthrough, the desired magnetisation vector 6 then results on the top 1 of the pill 3. This applies in the same way to the underside 2 of the pill 3 and to the lower magnetising head 5. The associated vectors 7 and 13 enclose between themselves the lower compensating angle t.

It can be seen from FIGS. 2 to 5 that the following equations apply to the abovementioned angles:

$x = (w - y)/2$, if $x = v$ $z = (r - w)/2$, if $z = t$

In the following text, the possibilities of determining the said compensating angle are discussed:

1. In an empirical manner, see FIG. 6. Under the given conditions (magnetisation, permeability, thickness of the pill and the like), the magnetisation is initially carried out without a compensating angle. A corresponding error angle then results at 14 on the ordinate to which the error angle x is assigned. The magnetizing heads 4 and 5 are now rotated stepwise relative to one another and so are their magnetisation vectors, the successive magnetisations of the pill being carried out as the compensating angle z is increased and the error angle x is reduced, along a line 15 which can be a straight line or a curve, until the point 16 is reached on the abscissa, where the compensating angle z can be read off in each case. When the pill is magnetised with this compensating angle z at the point 16 there will be no resulting error angle x.

2. The compensating angle can also be determined by calculation in accordance with the equation $$z = \arcsin\left(\frac{\sin x \cdot \sin w}{\sin(w - x)}\right).$$

The invention is not restricted to the illustrative embodiments shown and, in particular the invention can be used not only for magnetic locks, but wherever it is important to ensure an exact magnetisation of bodies. Finally, it should also be stated that the expression "surface magnetisation" is intended to mean no more than that the magnetisation is applied to surfaces opposite one another; in fact this magnetisation may not only be present on the surface but may also penetrate into the depths of the pills.

What is claimed as new and desired to be protected by Letters Patent is set forth in the appended claims:

1. A process for magnetizing two opposite sides of a body of magnetizable material, in particular magnetic pills for lock magnets and/or rotary magnets, comprising the steps of applying a magnetizing head to each of said two sides of the body; rotating magnetization vectors of said heads relative to one another through a compensating angle; thereafter, magnetizing both sides of said body by said heads; and the compensating angle being calculated in accordance with the equation $$z = \arcsin\left(\frac{\sin x \cdot \sin w}{\sin(w - x)}\right)$$

where z is the compensating angle of each vector with respect to the intended position of that vector in the magnetised body, x is the error angle of each vector with respect to its intended position when no angular compensation is made, and w is the angle included between the two magnetisation vectors in their intended position in the magnetised body.

2. Apparatus for magnetizing two opposite sides of a body of magnetizable material comprising two magnetizing heads arranged at a spaced relationship opposite one another to receive said body therebetween; means for rotating magnetization vectors of said heads relative to one another by a compensating angle in accordance with the equation $$z = \arcsin\left(\frac{\sin x \cdot \sin w}{\sin(w - x)}\right)$$

where z is the compensating angle of each vector with respect to the intended position of that vector in the magnetised body, x is the error angle of each vector with respect to its intended position when no angular compensation is made, and w is the angle included between the two magnetisation vectors in their intended position in the magnetised body.

* * * * *